Sept. 15, 1936.   G. T. ANDERSON,   2,054,064
BUTTERFLY VALVE
Filed Jan. 28, 1935

INVENTOR
Gotfried T. Anderson
BY
Parker, Carlson, Pitzner, Hubbard
ATTORNEYS

Patented Sept. 15, 1936

2,054,064

UNITED STATES PATENT OFFICE 2,054,064

BUTTERFLY VALVE

Gotfried T. Anderson, Rockford, Ill., assignor to Howard D. Colman, Rockford, Ill.

Application January 28, 1935, Serial No. 3,801

11 Claims. (Cl. 251—11)

This invention relates to valves for controlling the flow of fluids and more particularly to valves of the type commonly known as butterfly valves.

Valves of this type as heretofore commonly constructed have employed a butterfly in the form of a single, relatively thick member rigidly attached to a rotative stem extending through the valve bore. The member is ordinarily designed to engage the valve walls or abutments formed thereon before reaching a position perpendicular to the axis of the bore. In order to obtain a reasonably effective seal with this construction, the various parts of the valve must not only be very accurately made but they must be assembled so that the butterfly will be exactly centered in the valve bore. Considerable difficulty has been experienced in maintaining the effectiveness of such valves as any small leak around the butterfly soon results in excessive erosion or wiredrawing of the valve wall at this point, thereby greatly reducing the effectiveness of the valve.

The primary object of the invention is to produce an improved butterfly valve which is relatively inexpensive to manufacture and assemble, and which will provide and maintain a more effective seal than valves of this general character heretofore used.

Another object of the invention is the provision of a seaing member for a butterfly valve which, by reason of its improved construction, can be made to conform very closely in size and shape to the bore of the valve.

A further object of the invention is the provision of a valve butterfly which is self centering and can therefore be assembled in the valve by simple and easily performed operations.

Still another object of the invention is the provision of a valve having a butterfly which is reversible, that is, rotatable through a complete revolution thereby permitting the use of the valve for fluid flow in either direction.

Other objects and advantages of the invention will become apparent from the following detailed description taken in connection with the accompanying drawing, in which.

Figure 1:
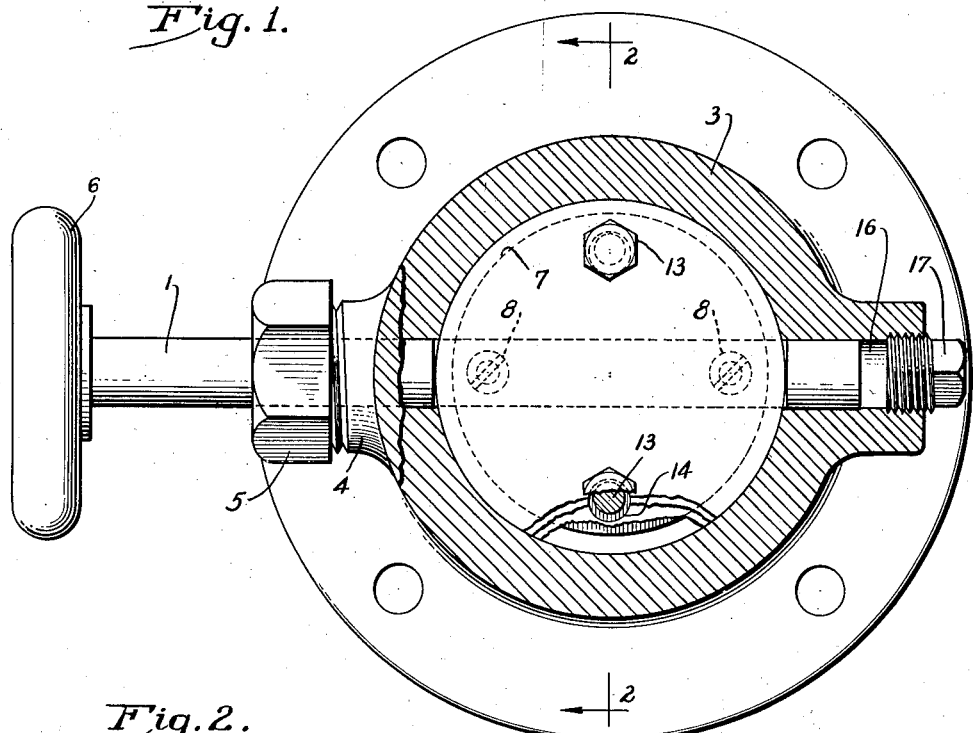
Figure 1 is an end view of a valve embodying the invention.

While the invention is susceptible of various modifications and alternative constructions, I have shown in the drawing and will describe in detail a preferred embodiment, but it is to be understood that I do not thereby intend to limit the invention to the specific form disclosed, but intend to cover all modifications and alternative constructions falling within the scope of the invention as expressed in the appended claims.

In carrying out my invention, I provide a valve casing within the cylindrical bore of which a butterfly is pivoted for rotation transversely of and substantially coaxially with the bore. The butterfly consists essentially of a plurality of thin, flat sealing members such as thin disks, conforming closely in size and shape to a normal section of the valve bore and backed up and supported by a rotative rigid supporting member. The sealing members are associated with their support in a manner such as to permit a limited degree of edgewise sliding movement with respect to each other and transversely of the valve passage by the cam action exerted on the edges of the disks by the wall of the bore as the butterfly moves into and out of closed position. In the closed position of the valve, the butterfly is disposed perpendicular to the axis of the valve bore, the disks facing the pressure or inlet end of the valve casing with their edges bearing upon the inner wall of the valve. The backing provided by the support member prevents the relatively thin sealing members from bending under the pressure to which they are subjected when the valve is in closed position. To open the valve, the butterfly is rotated toward a position parallel to the axis of the bore and the disks shift relative to one another as an incident to the movement of the butterfly toward and from its closed position.

In the illustrative embodiment, the pivot upon which the butterfly rotates is a valve stem 1, shown as a cylindrical shaft extending into an accurately formed cylindrical bore 2 of a valve casing 3 through a conventional stuffing box 4 closed by a pressure nut 5. A handle 6 on its outer end facilitates rotation of the stem. The opposite end of the shaft is journaled in a bearing recess 16 formed in the opposite side of the casing 3 and closed by a plug 17. To provide for the proper positioning of the butterfly, one side of the stem 1 is milled out to a depth slightly exceeding its radius. The portion of the stem within the bore 2 thus presents a flat face on one side and a semi-cylindrical face on the reverse side.

A supporting member 7 comprising a part of the butterfly is attached to the rounded side of the valve stem by means of screws 8. This member is formed in the shape of a disk of slightly smaller diameter than the sealing disks and has a flat face 9. A relatively thick rounded rib 10 extends diametrically across the back of the member. On the opposite side, the member 7 is formed with a semi-cylindrical groove 11 adapted to receive the rounded side of the valve stem so that the face 9 of the member 4 will lie in the same plane as the milled surface of the stem 1.

The sealing members 12 are thin circular disks accurately formed to a diameter slightly less than that of the valve bore 2. In the embodiment disclosed herein, three disks each approximately 0.025 inch thick are employed, these being mounted on the member 7 for edgewise sliding movement across the face of the latter with the middle disk disposed substantially in the plane of the stem axis. To this end, screws 13, threading into tapped holes 15, in the member 7, project through holes 14 in the disks which are larger than the screw shoulders but smaller than the screw heads to permit the disks to slide to a limited extent over each other and over the face of member 7. The shoulders on the screws are of such length that the disks may move freely relative to the member 7.

Figure 2:
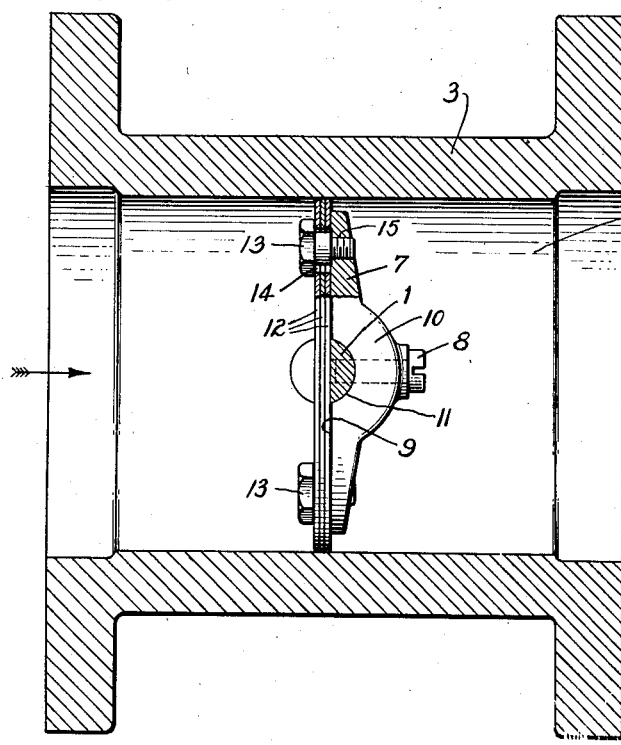
Fig. 2 is a sectional view along the line 2—2 of Fig. 1.
Figure 3:
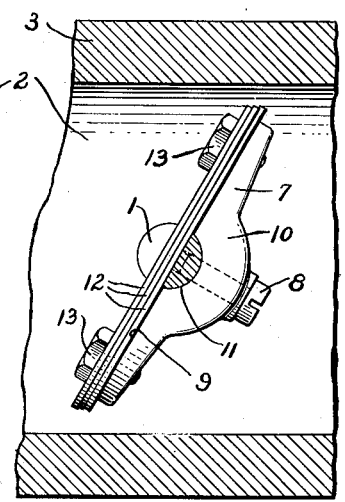
Fig. 3 is a fragmentary view showing the position of the sealing members or disks with the butterfly moved out of closed position.

The valve is closed and the bore effectually sealed against the flow of fluid when the butterfly is perpendicular to the axis of the bore with the disks facing the pressure end of the valve, that is, in opposition to the direction of fluid flow as indicated by the arrow in Fig. 2. In this position, the sealing disks are axially alined with the bore and have their edges in substantially sealing engagement with the valve wall. The valve is opened by rotating the butterfly to a position parallel with the axis of the bore. In the initial movement, the edges of the disks are forced against the valve wall which exerts a cam action on the disks to shift them edgewise relative to each other and the shaft 1 into the offset or stepped formation shown in Fig. 3. Reverse movement of the disks to bring them into alinement as shown in Fig. 2 occurs under the cam action exerted on the edges of the disks as the butterfly is rotated from open to closed position.

With the construction contemplated by the invention, a valve member of substantial thickness at its peripheral edges is provided, and yet only a very small clearance between the butterfly and the valve wall is required. For example, a clearance as small as a thousandth of an inch is sufficient to permit the rotation of the butterfly of a four inch valve through a complete revolution. The amount of clearance is determined by the thickness of the individual disks and the diameter of the valve bore. This is small in any case and the disks can be made to conform very closely to the size of the bore and thus effect a tighter seal than is practical with conventional butterfly constructions. Leakage of fluid around the butterfly is further inhibited by the multiple disk construction employed.

A further advantage residing in this construction is that it provides freedom for the butterfly to aline itself in the valve bore. Inaccuracies in manufacture and assembly as well as those resulting from wear of the parts are thus automatically compensated for. As a result, the effectiveness of the valve is easily maintained and leakage is reduced to a minimum. Actual use has shown that, with this construction, objectionable wiredrawing or erosion of the valve wall is substantially eliminated at pressures for which valves of this character are ordinarily used.

In addition to producing a more effective and longer lived valve, the laminated construction and the floating mounting of the butterfly permits the formation of an effective valve seal by simple and inexpensive manufacturing processes. With the butterfly constructed and mounted as above described, it is unnecessary to locate the butterfly accurately relative to its rotational axis as in the case of ordinary valves of this type. In other words, effectiveness of the seal is determined solely by the accuracy with which the disks 12 are formed. Since both of these are circular in form, the desired accuracy of relative size and shape may be obtained conveniently and the disks can, if desired, be formed as sheet metal stampings.

The present valve construction is also advantageous in that the butterfly can be rotated through a complete revolution. Thus the casing 3 may be mounted for flow of the fluid in either direction therethrough and the valve then adapted for proper control of the fluid simply by rotating the butterfly so that the pressure will always be applied to the disk side of the butterfly.

I claim as my invention:

1. In a butterfly valve, in combination, a casing having a cylindrical bore, a rotatable valve stem extending through the center of said bore and at right angles to the axis thereof, and a butterfly comprising a supporting member attached to the stem and positioned in and coaxially with the bore, and a plurality of sealing members slidably supported by said supporting member and shiftable relative to each in the movement of the butterfly toward and from closed position in said bore.

2. In a butterfly valve, in combination, a casing having a cylindrical bore, a rotatable member extending through the bore with its axis perpendicular to and intersecting the axis of the bore, a circular supporting member of substantially smaller diameter than the bore attached to said rotatable member, a plurality of relatively thin disks of substantially the same diameter as said bore, and means supporting the disks on said supporting member for relative movement with respect to each other and the member as an incident to the rotation of the member.

3. In a butterfly valve, in combination, a casing having a passage therethrough, a rotative element extending into and transversely of the passage, and a butterfly conforming substantially to the cross sectional area of said passage and slidably attached to said element for edgewise movement transversely of the axis of the passage in the rotational movement of the element.

4. A butterfly for a valve comprising, in combination, a rotatable supporting member, a plurality of relatively thin sealing members, and means slidably retaining said sealing members on said supporting member for edgewise movement relative thereto.

5. A butterfly valve comprising, in combination, a casing having a cylindrical bore, a rotatable member extending transversely through the bore, and a butterfly comprising a plurality of sealing members mounted on said rotatable member for relative edgewise movement and movable with the rotatable member to a position substantially coaxial with said bore.

6. In a butterfly valve, in combination, a casing having a bore, a butterfly comprising a plurality of thin sealing members disposed side by side and conforming generally in size to a cross section taken at right angles through the bore, and means supporting said members for relative edgewise movement and for rotation from a position in which its plane lies substantially parallel to the axis of the bore to a position in which its plane lies substantially perpedicular to the axis of the bore.

7. In a butterfly valve, in combination, a casing having a cylindrical bore, a shaft extending transversely through the bore, said shaft having a recess therein, a circular supporting member mounted on said shaft and having a groove in its face adapted to receive the recessed portion of the shaft, and a disk-shaped sealing member mounted on said supporting member for edgewise movement relative thereto and disposed in said recess coincident with a plane including the axis of said shaft.

8. In a butterfly valve, in combination, a casing having a passage therethrough, a rotative element extending into and transversely of the passage, a supporting member attached to said element and positioned substantially coaxially with the passage, and a rigid sealing member conforming substantially to the cross sectional area of the passage and slidably carried by said supporting member, for edgewise movement as an incident to the swinging of said member into or out of closing position in said passage.

9. In a butterfly valve, in combination, a casing having a cylindrical bore, a butterfly comprising a plurality of disks pivotally supported within the bore and movable relative to each other in an edgewise direction by engagement with the wall of the bore, and means for moving the butterfly on its pivot into a position in which the disks close the valve bore.

10. A butterfly valve having, in combination, a casing with a passage therethrough, a rotatable operating element extending into and transversely of said passage, and a rigid sealing member adapted to close said passage and form a snug fit with the walls thereof when the member is disposed in a position perpendicular to the axis of the passage, said member being supported by said element for edgewise movement relative thereto as an incident to pivotal movement of the member by said element into and out of said perpendicular position.

11. A butterfly valve having, in combination, a casing with a passage therethrough, a rotatable operating element extending into and transversely of said passage, and a butterfly mounted on said element within said passage and rotatable through a position perpendicular to the axis of the passage to face either end thereof, said butterfly comprising a plurality of passage sealing members mounted for relative edgewise movement as an incident to the movement of the butterfly to or from said perpendicular position.

GOTFRIED T. ANDERSON.